United States Patent [19]
Hori

[11] Patent Number: 6,084,863
[45] Date of Patent: Jul. 4, 2000

[54] METHOD AND SYSTEM FOR CONTROLLING A RADIO COMMUNICATION REPEATER

[75] Inventor: Hidetoshi Hori, Tokyo, Japan

[73] Assignee: NEC Corporation, Tokyo, Japan

[21] Appl. No.: 08/848,748

[22] Filed: May 1, 1997

[30] Foreign Application Priority Data

May 8, 1996 [JP] Japan ................................ 8-113346

[51] Int. Cl.⁷ .............................. H04J 3/08; H04B 7/212
[52] U.S. Cl. ...................... 370/315; 370/280; 370/501; 370/321
[58] Field of Search .................................. 370/280, 315, 370/317, 321, 337, 501

[56] References Cited

U.S. PATENT DOCUMENTS

| | | | |
|---|---|---|---|
| 4,107,608 | 8/1978 | Saburi | 370/324 |
| 4,972,506 | 11/1990 | Uddenfeldt | 370/337 |
| 5,072,445 | 12/1991 | Nawata | 370/324 |
| 5,355,368 | 10/1994 | Dore et al. | 370/296 |
| 5,396,496 | 3/1995 | Ito et al. | 370/337 |
| 5,699,355 | 12/1997 | Natarajan | 370/332 |
| 5,742,589 | 4/1998 | Murata | 370/249 |
| 5,790,535 | 8/1998 | Kou | 370/337 |
| 5,883,884 | 3/1999 | Atkinson | 370/279 |

FOREIGN PATENT DOCUMENTS

7-143090  6/1995  Japan .

*Primary Examiner*—Hassan Kizou
*Assistant Examiner*—Saba Tsegaye
*Attorney, Agent, or Firm*—Young & Thompson

[57] ABSTRACT

A radio communication system and the method thereof which can eliminate influence of atmospheric interference or an interference signal having a strong signal level and which can allow repeater transmission without difficulty. A plurality of repeater stations are located between an upper station and a lower station, and each repeater station transmits a TDMA signal whose received signal level exceeds a reference value transmitted from the lower station to the upper station. The upper station generates usage state information for respective time slots of the received TDMA signal, and transmits the usage state information to each repeater station. Each repeater station determines whether or not the corresponding time slot of the TDMA signal to be repeated is used in accordance with the usage state information received from the upper station and, if the time slot is unused, the repeater transmission to the corresponding time slot is allowed. If the time slot is used due to interference from another repeater station, the repeater transmission to the time slot is restrained.

7 Claims, 9 Drawing Sheets

METHOD AND SYSTEM FOR CONTROLLING A RADIO COMMUNICATION REPEATER

BACKGROUND OF THE INVENTION

(i) Field of the Invention

The present invention relates to a repeater control technique of a radio communication system with use of a TDMA (Time Division Multiple Access) and a TDM (Time Division Multiplex) signal, more specifically, it relates to a radio communication repeater control system which can restrain an erroneous repeater transmission even under circumferences influenced by atmospheric interference, an interference signal, a jamming signal or the like when a repeater system using a received level detection is adopted.

(ii) Description of the Prior Art

For example, a TDMA radio communication system comprising a star-shaped network is so constituted that multiple lower stations in an area are connected to an upper station via a repeater station installed in the same area. Although various methods of a repeater system in the repeater station have been proposed, the repeater system using received level detection is generally chosen from the various methods.

According to the repeater system using received level detection, a received signal level of the inputted TDMA signal is detected, and a repeater transmission is carried out in accordance with the detection result. Accordingly, when the received level of the outside arriving atmospheric interference, interference signal, jamming signal or the like is strong, an error detection occurs, whereby a disadvantageous erroneous repeater transmission is carried out.

Figure 1:
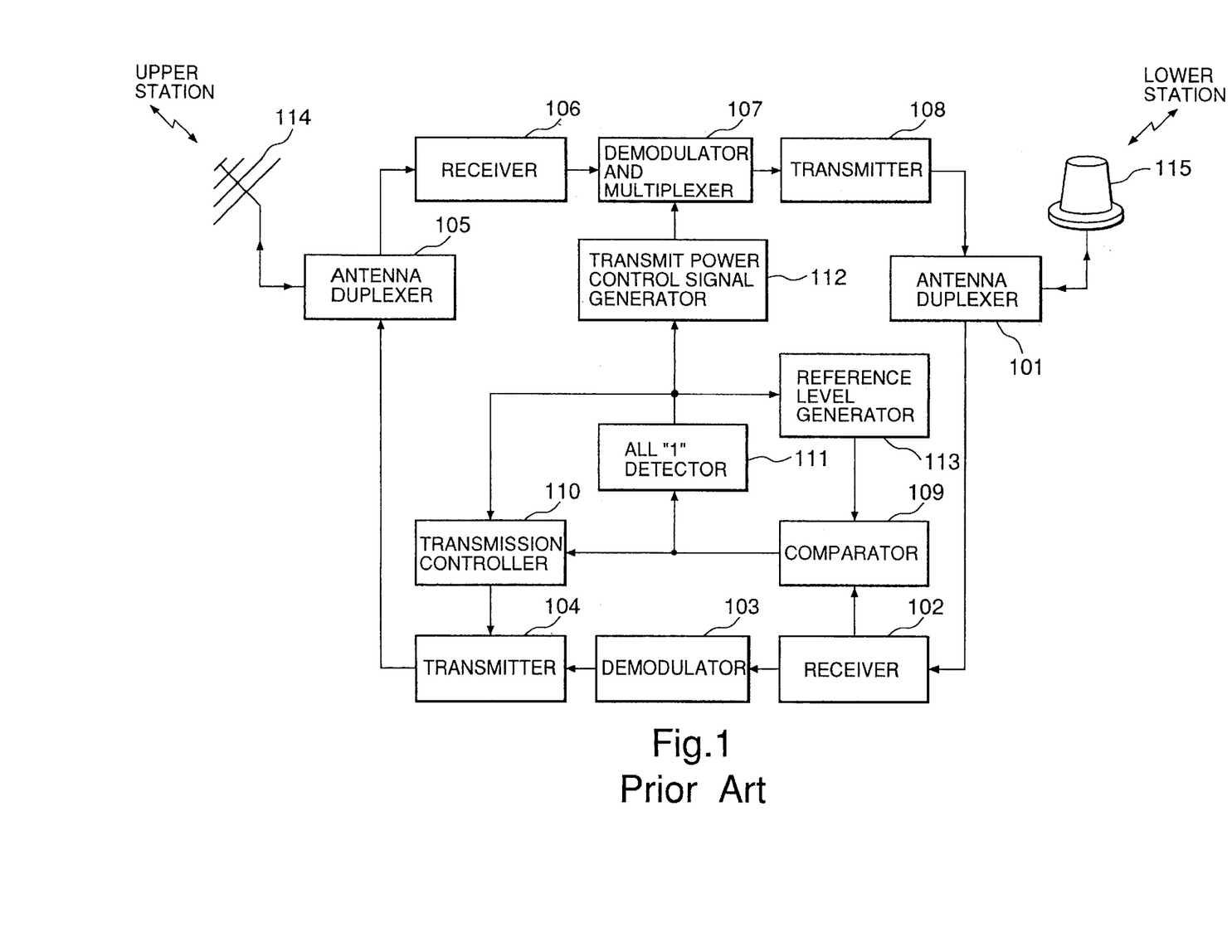
FIG. 1 is a block diagram showing a constitution of a conventional repeater station.

As a means for overcoming such a disadvantage and for realizing a correct repeater transmission in the case of a strong received level of the interference signal or the like, for example, the radio communication repeater control system disclosed in Japanese Patent Laid-open No. 143090/1995 has been proposed. FIG. 1 is a block diagram of the repeater station proposed in this publication.

Referring to FIG. 1, a directional antenna 114 at the left side and a nondirectional antenna 115 at the right side are faced to the upper station and the lower station, respectively. The repeater transmission from the upper station to the lower station adopts a TDM signal system which continuously transmits each time slot signal. That is to say, the repeater station shown in FIG. 1 transmits the signal which is transmitted from the upper station and is received by the directional antenna 114 from the nondirectional antenna 115 to the lower station via an antenna duplexer 105, a receiver 106, a demodulator 107, a transmitter 108 and an antenna duplexer 101. The lower station selectively receives the assigned time slot signal.

On the other hand, the repeater transmission from the lower station to the upper station adopts a TDMA signal system which transmits a burst signal to the assigned time slot, and the repeater transmission is carried out in the following way.

That is, the burst signal which is transmitted from the lower station and is received by the nondirectional antenna 115 is inputted to a receiver 102 via the antenna duplexer 101. The input signal is amplified, it is outputted to the demodulator 103, and received signal level information is extracted in accordance with the input signal level, so that it is outputted to a comparator 109.

The comparator 109 compares the received signal level from the receiver 102 and a reference level held from a reference level generator 113 described below. During a period when the received signal level exceeds the reference level, the comparator signal is outputted at a logic "1". When the received signal level is less than the reference level, the comparator signal is outputted at a logic "0". As described above, the signal from the lower station is a burst transmission. Furthermore, since a predetermined width time interval is disposed between the adjacent time slots, in a normal state, the comparator 109 alternately cycles to output the signals at the logic "1" and "0" depending on the presence of a received signal. However, when a continuous interference signal or the like whose received signal level exceeds a reference level exists, the signal level of the signal outputted from the comparator 109 is fixed at the logic "1".

An all "1" detector 111 monitors a change of state of the output level from the comparator 109. In case that the period of the output level from the comparator 109 a the logic "1" exceeds a time width of one time slot and the period further continues, this is judged to be an abnormal repeater operation. The signal indicative of the abnormal repeater operation is outputted to be transmission controller 110, a transmit power control signal generator 112 and the reference level generator 113. On the contrary, when the output level from the comparator 109 changes between a logic "1" and "0", it is judged that a normal repeater operation can be carried out, so that the output of the abnormal repeater operation signal is stopped.

In a usual state, the transmission controller 110 outputs a transmission instructing signal to the transmitter 104 corresponding to the input at the logic "1" level from the comparator 109. However, when the abnormal repeater operation signal is inputted from the all "1" detector 111, all the transmission instructing signals to be outputted to the transmitter 104 are inhibited. As a result, while the abnormal repeater operation occurs, it is possible to prevent the erroneous repeater transmission from the repeater station to the upper station.

Furthermore, referring to FIG. 1, the transmit power control signal generator 112 receives the abnormal repeater operation signal from the all "1" detector 111, and it generates "a transmission output switching request" signal for increasing the transmission output power (henceforth, referred to as the "transmission output switch requesting signal") to be multiplexed in a repeater transmitting signal to the lower station, so that the transmission output switching request signal is outputted to demodulator and multiplexer 107. The demodulator and multiplexer 107 multiplexes the transmission output switching request signal to the signal from the upper station. The multiplexed signal is transmitted from the nondirectional antenna 115 to the lower station via the transmitter 108 and the antenna duplexer 101. As a result, the lower station increases the transmission output power in accordance with an instruction from the transmission output level switch requesting signal. At the same time, the reference level generator 113 receives the abnormal repeater operation signal from the all "1" detector 111, and it increases the reference level supplied to the comparator 109 from an initial level.

As described above, the output transmitted from the lower station is increased, whereby the received signal level information input to the comparator 109 can be increased, and the reference level to be inputted from the reference level generator 113 to the comparator 109 can be increased. Accordingly, until the all "1" detector 111 does not generate the abnormal repeater operation signal, the output of the transmission output switching request signal to the lower station and the increase of the reference level outputted from the reference level generator 113 are repeated until a state wherein the normal received signal level information alone exceeds the reference level can be achieved. In this state, the transmission controller 110 determines whether or not the repeater operation is carried out corresponding to the level of the signal inputted from the comparator 109, whereby the normal repeater operation which is not influenced by the interference signal, the jamming signal or the like can be carried out.

That is to say, according to a conventional radio communication repeater control system, the output to be transmitted from the lower station is increased, the difference between the interference signal or the like and the transmission output is increased, whereby reliability of the received signal level information is improved, so that the normal repeater transmission which is not influenced by the interference signal or the like is realized.

The means for increasing the output transmitted from the lower station is effective in carrying out repeater transmission which is not influenced by the interference signal or the like. Note that each lower station is provided with a transmitter which enables it to vary the transmission output. Although this itself is not so technically difficult, there is a problem that a semiconductor element having a margin which can increase the transmission output, and its control circuit or the like must be adopted to the transmitter of each lower station.

In addition to this, there is another problem that power efficiency is considerably reduced when the semiconductor element whose output is high, for example, a transistor or the like, is used to obtain a low output. Furthermore, although the above conventional technique is effective in preventing the influence of the interference signal or the like, there is a further problem in that preventing the influence of a pulse interference signal such as lightning and spark noise cannot be obtained.

SUMMARY OF THE INVENTION

It is an object of the present invention to provide an improved radio communication repeater control system which does not increase transmission output from radio equipment at each station under circumstances of atmospheric interference, an interference signal, a jamming signal and the like exist, and which can eliminate influence due to these effects, and can continue a repeater transmission without any trouble.

In order to solve the above problems, the present invention is applied to a TDMA radio communication system in which multiple lower stations in an area carry out a radio communication with an upper station via a repeater station installed in the same area. As a repeater system, the radio communication repeater control system which adopts a repeater system using a received level detection is provided. According to the present invention, the upper station comprises means for generating usage state information of each time slot of a TDMA signal and for transmitting it to each repeater station. In this case, preferably, the upper station is also provided with monitor means for monitoring the normality of each time slot signal of the received TDMA signal, whereby the usage state information of the time slot is transmitted to each repeater station only when the received signal is normal.

Furthermore, the repeater station is provided with the following function blocks.

(1) comparison means for comparing each time slot received signal level of the TDMA signal transmitted from the lower station to a reference value and for determining whether or not a received burst signal exists.

(2) transmitting means for transmitting the received burst signal to the upper station when the received burst signal exists. The conventional comparison means and transmitting means can be used.

(3) means for extracting the usage state information of each time slot transmitted from the upper station.

(4) repeater control means for controlling transmission operation of the transmitting means in accordance with the extracted usage state information and the information determined by the comparison means.

For example, the repeater control means comprises means for generating a binary signal indicative of a logical value corresponding to the usage state of respective time slots from the extracted usage state information and comparison means for generating a first binary signal indicative of the logical value corresponding to whether or not the received burst signal exists in the time slot when the time slot is not used, for generating a second binary signal indicative of the logical value at the change of the unused time slot to a used state corresponding to whether or not the received burst signal exists just before the change, for comparing a first logical condition to the binary signal indicative of the logical value corresponding to the current usage state of the first and second binary signals and the corresponding time slot and for comparing a second logical condition to the judged first logical condition and the first binary signal, wherein the transmission operation of the transmitting means is controlled in accordance with the comparison result by the comparison means. When each logical value uses positive logic, the first logical condition is a logical OR, and the second logical condition is a logical AND.

According to a more suitable embodiment, the repeater control means further comprises inherent information detecting means for detecting inherent information provided for each received burst signal and for generating a fourth binary signal having a logical value corresponding to the inherent information, wherein the comparison result of the logical condition of the fourth binary signal and the first binary signal is defined as the logical value indicative of whether or not the received burst signal exists.

As described above, according to the radio communication repeater control system according to the present invention, the upper station generates the usage state information of the respective time slots of the TDMA signal received via the repeater station, and it transmits the usage state information to each repeater station. Each repeater station judges whether or not the time slot of the TDMA to be repeated is unused or used from the usage information received from the upper station. When the time slot is unused, the repeater transmission in the time slot is allowed. On one hand, when the time slot is used due to the repeater transmission at another station, the repeater transmission in the time slot is restrained. By carrying out such a control, when it is determined that the time slot is used at the upper station, the repeater transmission of all the repeater stations except for the repeater station which carries out the normal repeater transmission at the corresponding time slot is restrained. Accordingly, once the radio link is normally connected, error transmission from another repeater station is prevented.

DETAILED DESCRIPTION OF THE PREFERRED EMBODIMENTS

Embodiments in case of applying the present invention to a radio communication system will be described below with reference to the accompanying drawings.

Figure 2:
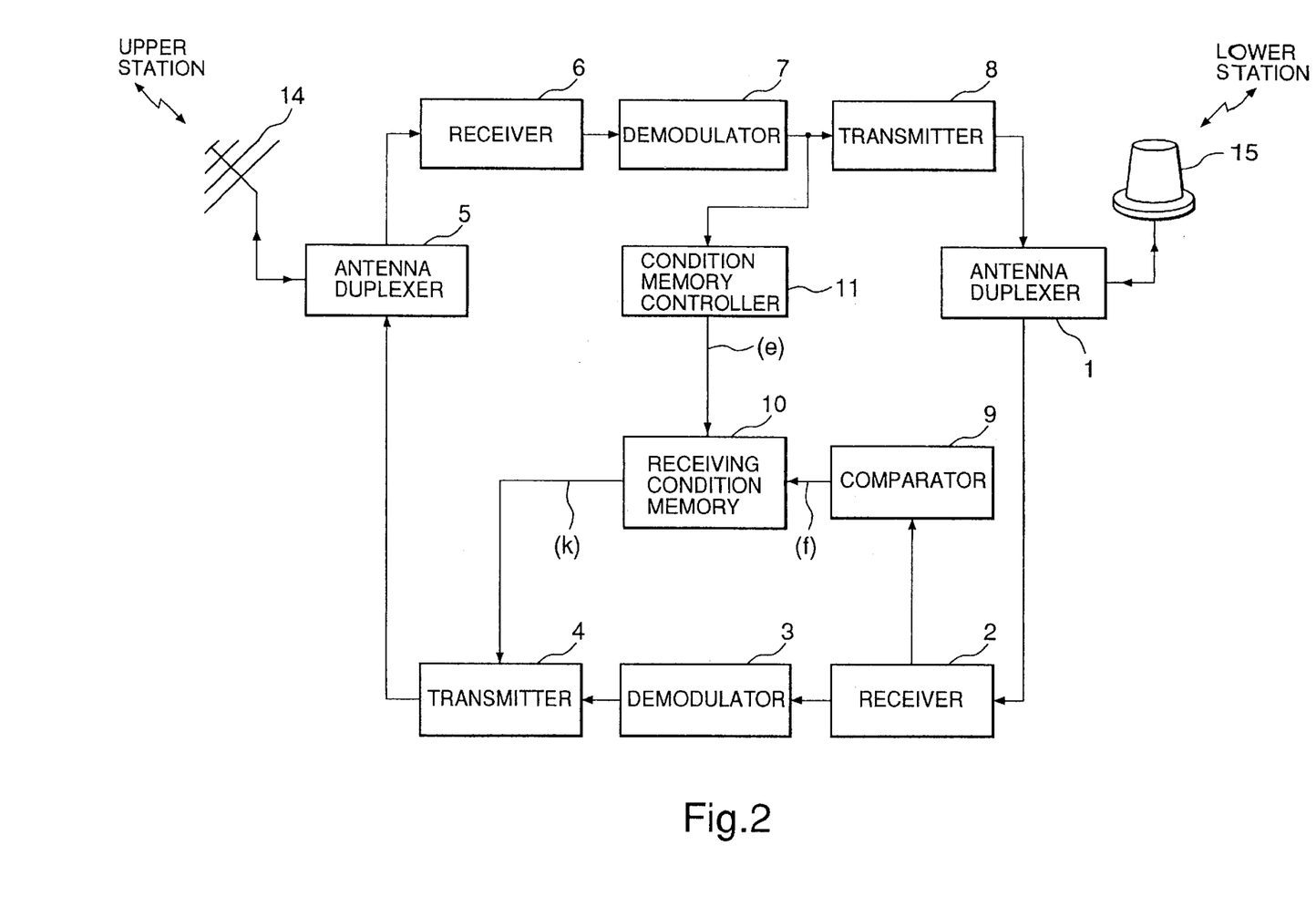
FIG. 2 is a block diagram of the constitution of the repeater station according to an embodiment of the present invention.
Figure 3:
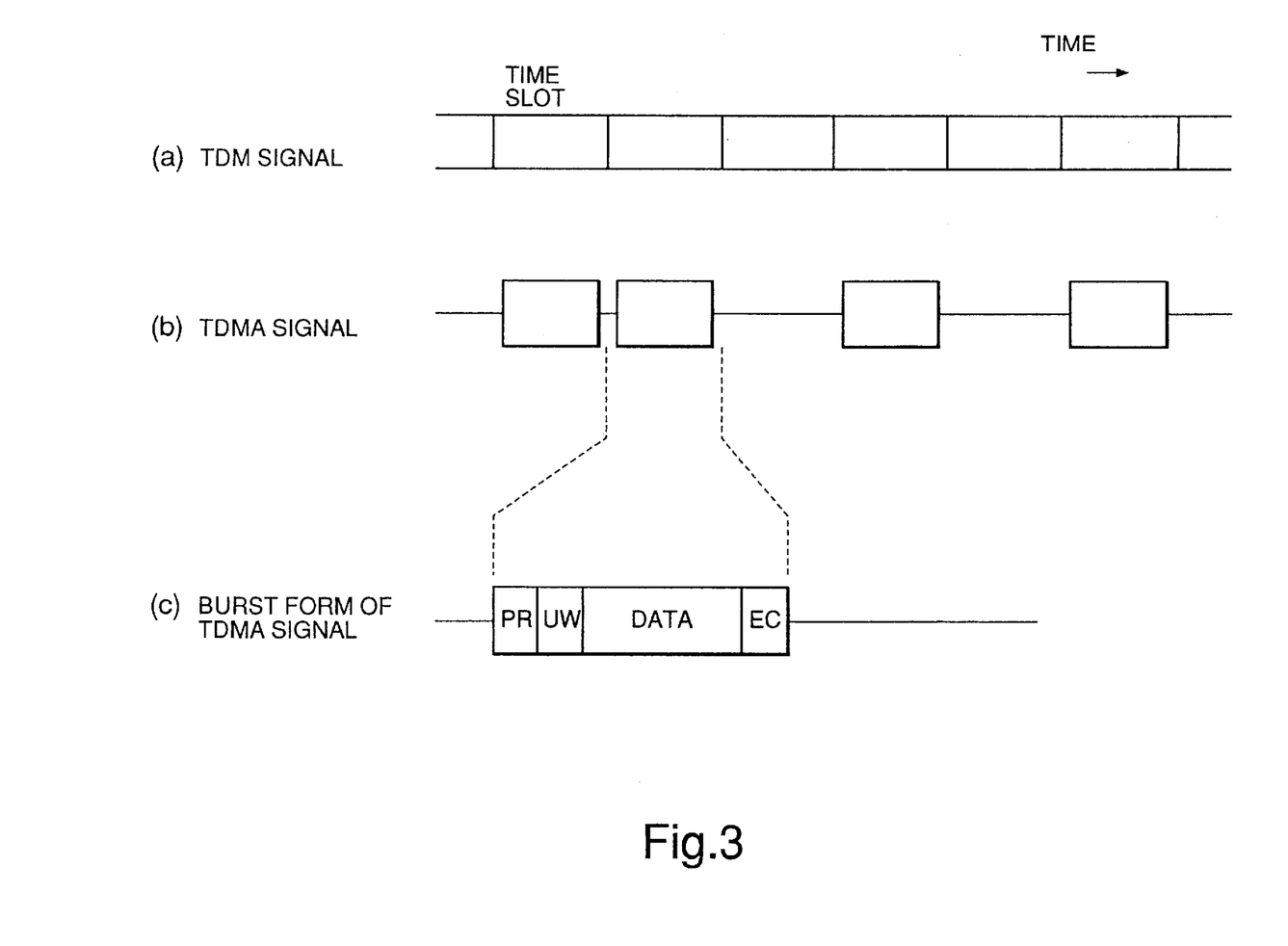
FIG. 3(a) shows a time slot of a TDM signal system from an upper station to a lower station.
FIG. 3(b) and 3(c) show a time slot of the TDMA signal system from a lower station to an upper station.

FIG. 2 is a block diagram of a repeater station according to an embodiment of the present invention. In the repeater station, a signal from an upper station to a lower station adopts a TDM signal system. As shown in FIG. 3(a), this signal takes the form of a plurality of chained time slot signals. In contrast, the signal from the lower station to the upper station adopts a TDMA signal system. This signal form is shown in FIGS. 3(b) and 3(c). This TDMA signal consists of a burst signal comprising a preamble (PR) followed by a unique word (henceforth, referred to as UW), data inherent in the burst signal, and an error control signal (EC: error control bit). Note that processing for each time slot is synchronized by the TDM signal at each of the repeater stations and the lower station.

In the repeater station shown in FIG. 2, a signal repeating from the upper station to the lower station is carried out as described below.

The TDM signal from the upper station to the lower station received by a directional antenna 14 is separated in an antenna duplexer 5, the separated signal is amplified at a receiver 6, and it is demodulated in a demodulator 7 so that a digital signal sequence is obtained. A transmitter 8 remodulates the digital signal sequence from the demodulator 7, and the modulated digital signal sequence is transmitted from a nondirectional antenna 15 to the lower station via an antenna duplexer 1. The lower station, if required, selects and receives the assigned time slot signal.

A condition memory controller 11 extracts repeater control information included in the digital signal sequence from the demodulator 7, and a condition memory control signal (e) is outputted to a receiving condition memory 10. The condition memory control signal (e) is changed in accordance with a usage state of each time slot of the TDMA signal. The repeater control information extracted by the condition memory controller 11, is multiplexed with the TDM signal, and is transmitted to each repeater station, resulting in the usage state of each time slot judged in the uppermost station, being provided to the lower station.

On the other hand, the signal repeating from the lower station to the upper station is carried out as described below.

The signal which is transmitted from the lower station and is received by the nondirectional antenna 15 is separated in the antenna duplexer 1. The separated signal is amplified in a receiver 2, and it is outputted to a demodulator 3. Furthermore, received signal level information is extracted in accordance with a received signal level, and it is outputted to a comparator 9.

The demodulator 9 demodulates the signal amplified by the receiver 2 to a digital signal sequence, and the demodulated signal is outputted to a transmitter 4. The comparator 9 compares the received signal level from the receiver 2 with a reference level held inside the comparator 9. A burst detection signal (f) is outputted at a "detected level, for example, with use of a logic "1", during a period when the receiving signal level information exceeds the reference level, that is, during the period wherein it is judged that the burst signal exists in the received signal. If the burst signal does not exist in the received signal, the burst detection signal (f) is outputted at a "not detected" level, for example, with use of a logic "0". Since the signal from the lower station to the upper station is the TDMA signal, the signal level of the burst detection signal (f) outputted from the comparator 9 is changed in accordance with whether or not the burst signal exists in each time slot of the TDMA signal.

As described below, the receiving condition memory 10 has a memory circuit including as many memory elements as the time slots of the TDMA signal and its control circuit. In accordance with the control by the condition memory control signal (e) from the condition memory controller 11, the signal level of the burst detection signal (f) in each time slot from the comparator 9 is stored in the receiving condition memory 10.

Furthermore, in accordance with the control by the condition memory control signal (e) from the condition memory controller 11, a transmission control signal (k) having correspondence to the usage of respective time slots is outputted from the receiving condition memory 10. The transmitter 4 re-modulates the digital signal sequence from the demodulator 3 in the corresponding time slot using an input timing of the transmission control signal (k) from the receiving condition memory 10, and the modulated digital signal sequence is transmitted to the upper station from the directional antenna 14 via the antenna duplexer 5.

Figure 4:
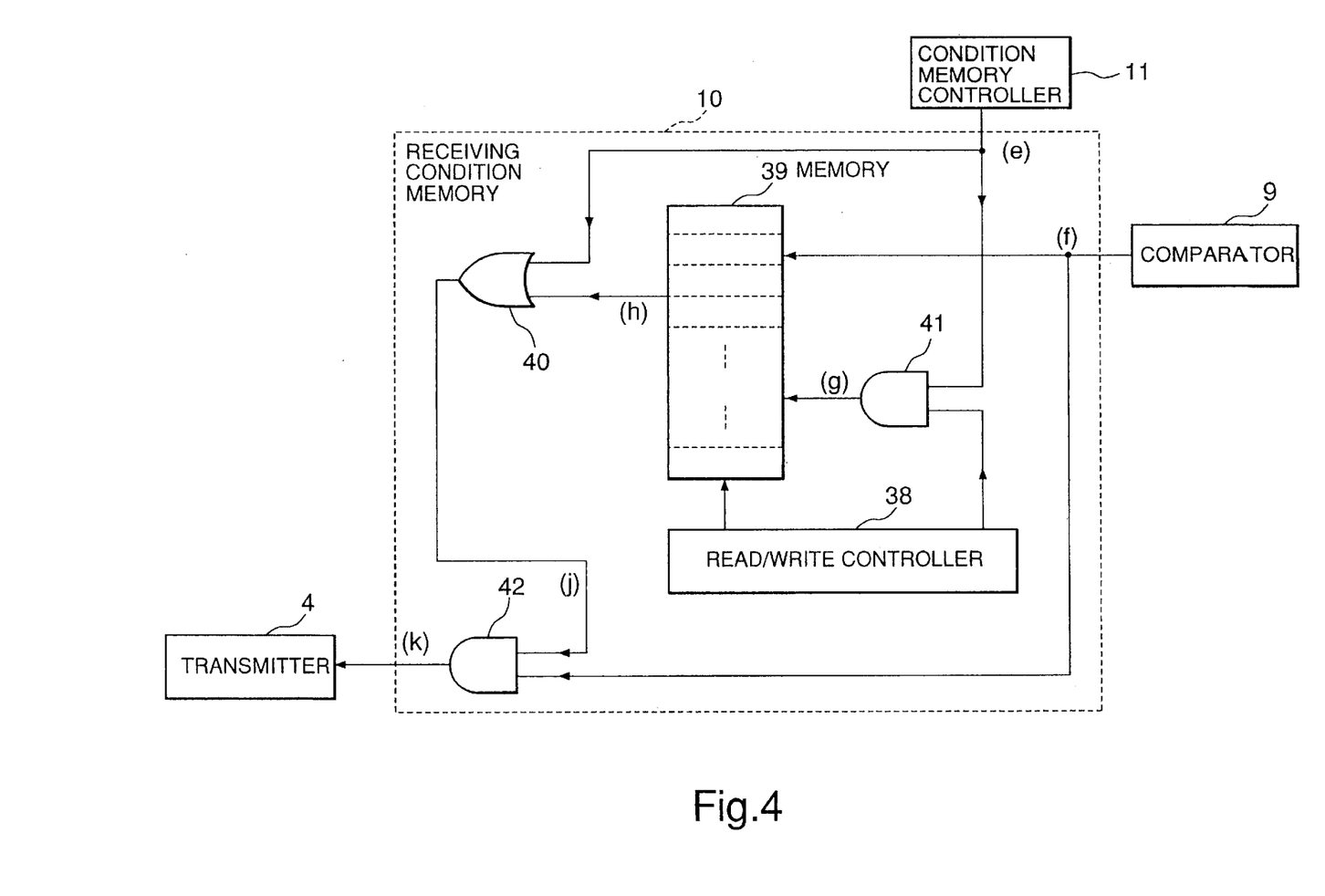
FIG. 4 is a block diagram showing a constitution of a receiving condition memory 10 shown in FIG. 2.

Next, the receiving condition memory 10 will be described in detail with reference to FIG. 4.

The receiving condition memory 10 comprises a read/write controller 38, a memory 39 and a plurality of logic circuits 40, 41, 42. The read/write controller 38 periodically carries out as many operations as the time slots of the TDMA signal, and it outputs an address signal and a write timing signal. A process timing by the read/write controller 38 depends upon the TDM frame timing which is transmitted from the uppermost station. The logic circuit 41 executes a logical AND of the write timing signal from the read/write controller 38 and the condition memory control signal (e) from the condition memory controller 11, and it outputs a write signal (g).

The memory 39 comprises as many memory elements as the time slots of the TDMA signal. In accordance with the write signal (g) from the logic circuit 41, the burst detection signal (f) from the comparator 9 is stored in the memory element specified by the address signal from the read/write controller 38.

The condition memory control signal (e) outputted from the condition memory controller 11 is the signal representative of the extracted repeater control information which is multiplexed to the TDM signal from the uppermost station and is transmitted to each repeater station. By the condition memory control signal (e), each repeater station can know the usage state of each time slot of the TDMA signal. For example, if the time slot of the TDMA signal is not used, the condition memory controller signal (e) is "renewed", that is, it becomes a logic "1". On other hand, if the time slot is being used, the condition memory control signal (e) is "maintained", that is, a logic "0".

When the condition memory control signal (e) is changed from the "renewed" state to the "maintained" state, that is, when the unused time slot of the TDMA signal is changed to a used state, the receiving condition memory 10 holds the signal level of the burst detection signal (f) in the memory 39 just prior to the change. That is to say, the receiving condition memory 10 inhibits the burst detection signal (f) from being stored in the memory circuit 39. In contrast, when the condition memory control signal (e) is in the "renewed" state, that is, when the time slot of the TDMA signal is unused, the burst detection signal (f) is periodically stored (renewed) in the corresponding location in the memory 39.

An OR circuit 40 executes a logical OR of an output (h) from the memory 39 and the condition memory control signal (e) from the condition memory controller 11. An AND of an output (j) from the OR circuit 40 and the burst detection signal (f) from the comparator 9, and it outputs the result to the transmitter 4 as the transmission control signal (k). The transmission control signal (k) becomes, for example, either the logic "0" for restraining a transmission operation of the transmitter 4 (i.e. and inhibited state) or the logic "1" for allowing the transmission operation (i.e. an allowed state).

In such a manner, when the unused time slot of the TDMA signal is changed to the used state, the transmission operation of the transmitter 4 is controlled by means of the logical AND of the burst detection signal (f) just prior to the change and a current-state burst detection signal (f) from the comparator 9. On other hand, when the time slot of the TDMA signal is unused, the transmission operation of the transmitter 4 is controlled in accordance with the current-state burst detection signal (f) from the comparator 9.

Figure 5:
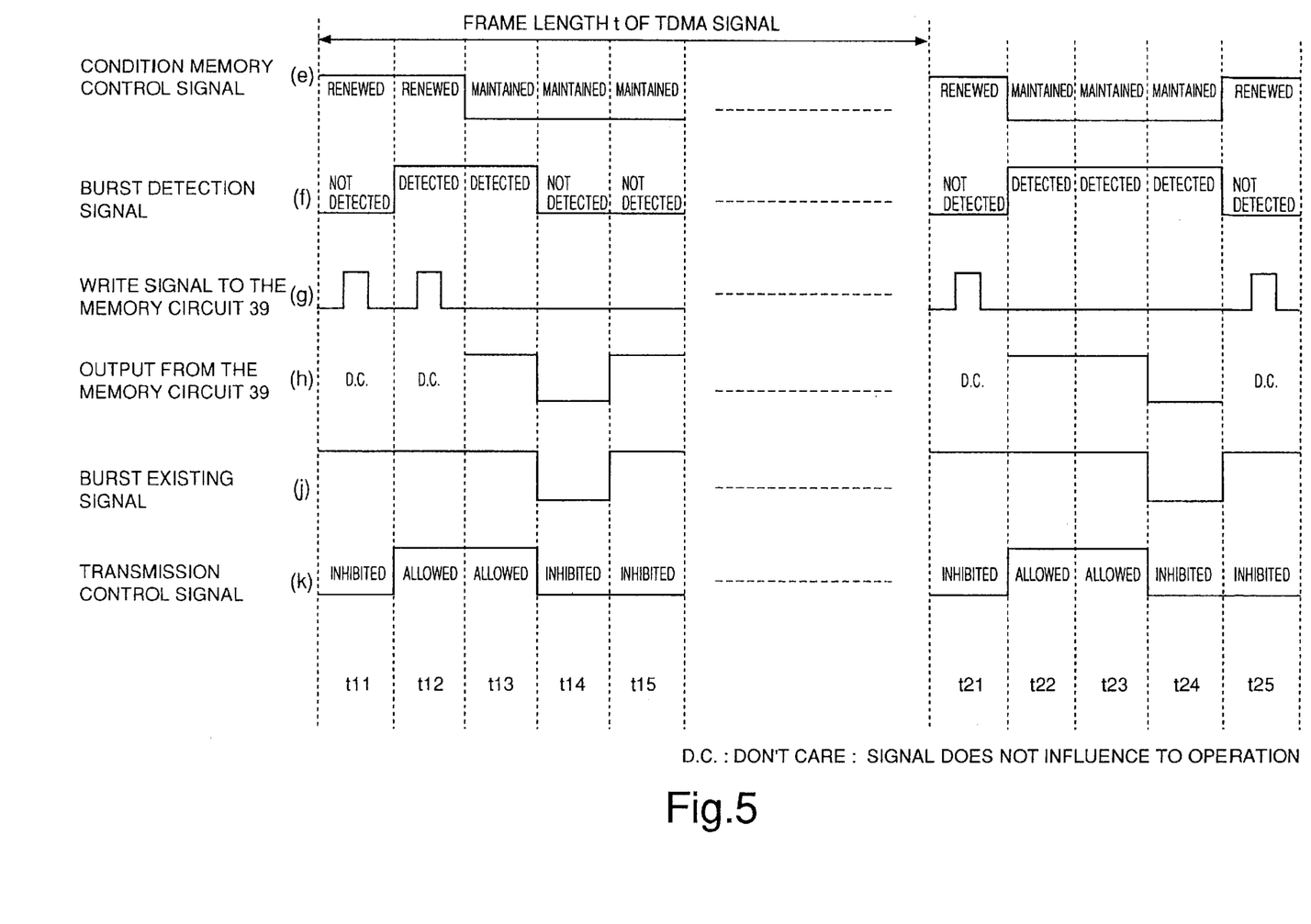
FIG. 5 is timing chart of each portion of the receiving condition memory 10 shown in FIG. 2.

The operation of the repeater station with use of the receiving condition memory 10 will be more concretely described with referent to timing wave forms shown in FIG. 5.

Referring to FIG. 5, a repeating period t denotes a frame length of the TDMA signal. In addition, symbols t11 . . . t15 denote respective time slots of the TDMA signal, and symbols t21 . . . t25 denote respective time slots of the TDMA signal after one period.

In the time slots t11 and t21, since the time slot of the TDMA signal is unused, the condition memory control signal (e) from the condition memory controller 11 becomes the "renewed" state, that is, the logic "1", and the write signal (g) becomes the logic "1", that is, an enable signal, so that the signal level of the existing burst signal (f), that is, the "not detected" level is written in the memory 39. Furthermore, since the burst detection signal (f) is at the "not detected" level, the transmission instructing signal (k) is in the inhibited state.

In the time slot t12, the condition memory control signal (e) is in the "renewed" state in case that the repeater station just starts a repeater transmission to the corresponding time slot. In this case, the burst detection signal (f) at the "detected" level is inputted from the comparator 9, and the "detected" level is written in the memory 39. Furthermore, since the burst detection signal (f) is at the "detected" level, the transmission control signal (k) is changed from the inhibited state to the allowed state.

In the time slot t22 after the one period, due to the repeater transmission of the repeater station itself, it is judged that the corresponding time slot is being used at the uppermost station. In this case, since the condition memory control signal (e) from the condition memory control signal 11 becomes the "renewed" state and the write signal (g) becomes the logic "0", that is, a disable signal, the write to the memory 39 is inhibited. At this point, an output signal (h) from the memory 39 is outputted at the signal level of the burst detection signal (f) just before the unused time slot is changed to the used state, that is, at the "detected" level of the time slot t12. Furthermore, since the burst detection signal (f) from the comparator 9 is at the "detected" level, the transmission control signal (k) becomes the allowed state.

In the time slots t13 and t23, the repeater transmission to the time slot is continuously carried out at the repeater station. In this case, since each of the time slots t13 and t23 is being used, the condition memory control signal (e) from the condition memory controller 11 remains "maintained", and the write to the memory circuit 39 is inhibited. At this point, the output (h) from the memory 39 remains being outputted at the burst detection signal (f) level just before the unused time slot gets to be used, that is, at respective "detected" levels. Furthermore, since the burst detection signal (f) from the comparator 9 is at the "detected" level, the transmission control signal (k) remains allowed.

In the time slot t14, the repeater transmission to the time slot is not carried out at this repeater station, that is to say, the repeater transmission is carried out at any other repeater station. In this case, since the time slot is being used, the condition memory control signal (e) from the condition memory controller 11 is "maintained", and the write to the memory 39 is inhibited. At this point, the burst control signal (f) at the burst control signal (f) level just before the unused time slot is changed to the used state, for example, at the "not detected" level in the time slot t04 in the previous period is written in the memory 39. Accordingly, in the time slot t14, the "not detected" level is outputted from the memory circuit 39. Moreover, since the burst existing signal (f) from the comparator 9 is at the "not detected" level, the transmission control signal (k) is inhibited.

In the time slot t24 after the one period, although the condition memory control signal (e) from the condition memory controller 11 is "maintained", the burst control signal (f) is inputted from the comparator 9 at the "detected" level. This is the case that, when the repeater transmission is carried out at any other repeater station, the signal is inputted from the lower station of the repeater station for some reason and the comparator 9 determines the "detected" level. In this case, the output (h) from the memory 39 is at the burst control signal (f) level just before the unused time slot is changed to the used state, that is, at the "not detected" level of the time slot t14, the transmission control signal (k) is inhibited.

In the time slot t15, although the condition memory control signal (e) from the condition memory controller 11 is "maintained", the repeater transmission to the time slot is just completed. In this case, since the time slot remains used, the condition memory control signal (e) is "maintained", and the write to the memory 39 remains inhibited. However, since the burst detection signal (f) is inputted from the comparator 9 at the "not detected" level, the transmission control signal (k) is inhibited.

In the time slot t25 after the one period, it is judged that the time slot is not used at the uppermost station. Since the condition memory control signal (e) from the condition memory controller 11 is "renewed", the write to the memory 39 is started. At this point, since the burst control signal (f) is inputted from the comparator portion 9 at the "not detected" level, the transmission control signal (k) is inhibited.

As understood by the time slot t24 shown in FIG. 5, a radio communication repeater control system according to the present invention can restrain an error repeater transmission when a normal repeater transmission is carried out at some repeater station, even if the signal having a strong received signal level is inputted to another repeater station due to some interference.

This will be described below with reference to FIG. 6.

Figure 6:
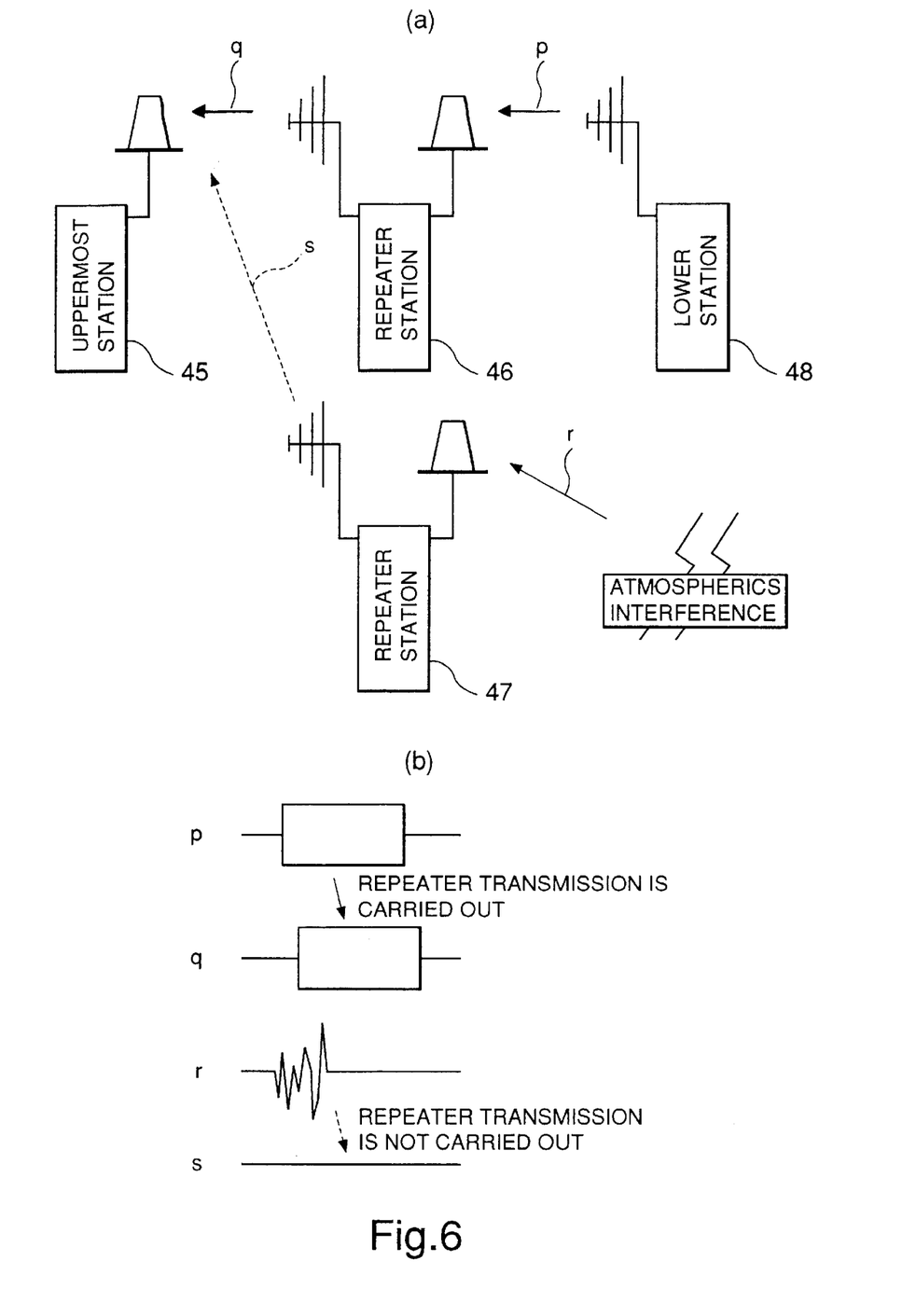
FIG. 6 is a block diagram for illustrating an operation of the repeater station shown in FIG. 2.

In some time slot shown in FIG. 6(b), when a repeater station 46 carries out the repeater transmission of a TDMA burst signal p transmitted from a lower station 48, a noise signal r due to an atmospheric interference is inputted to another repeater station 47 at the same slot timing, and the comparator 9 detects the burst control signal at the "detected" level. On this assumption, since, with this timing, the information indicative of the used time slot is transmitted from an uppermost station 45 to the receiving condition memory 10 in the repeater station 47, the error repeater transmission s from the repeater station 47 to the uppermost station 45 is restrained. FIG. 6(b) shows this mode. Accordingly, a burst signal q not influenced by the atmospheric interference is outputted from the repeater station 46 to the uppermost station 45.

Figure 7:
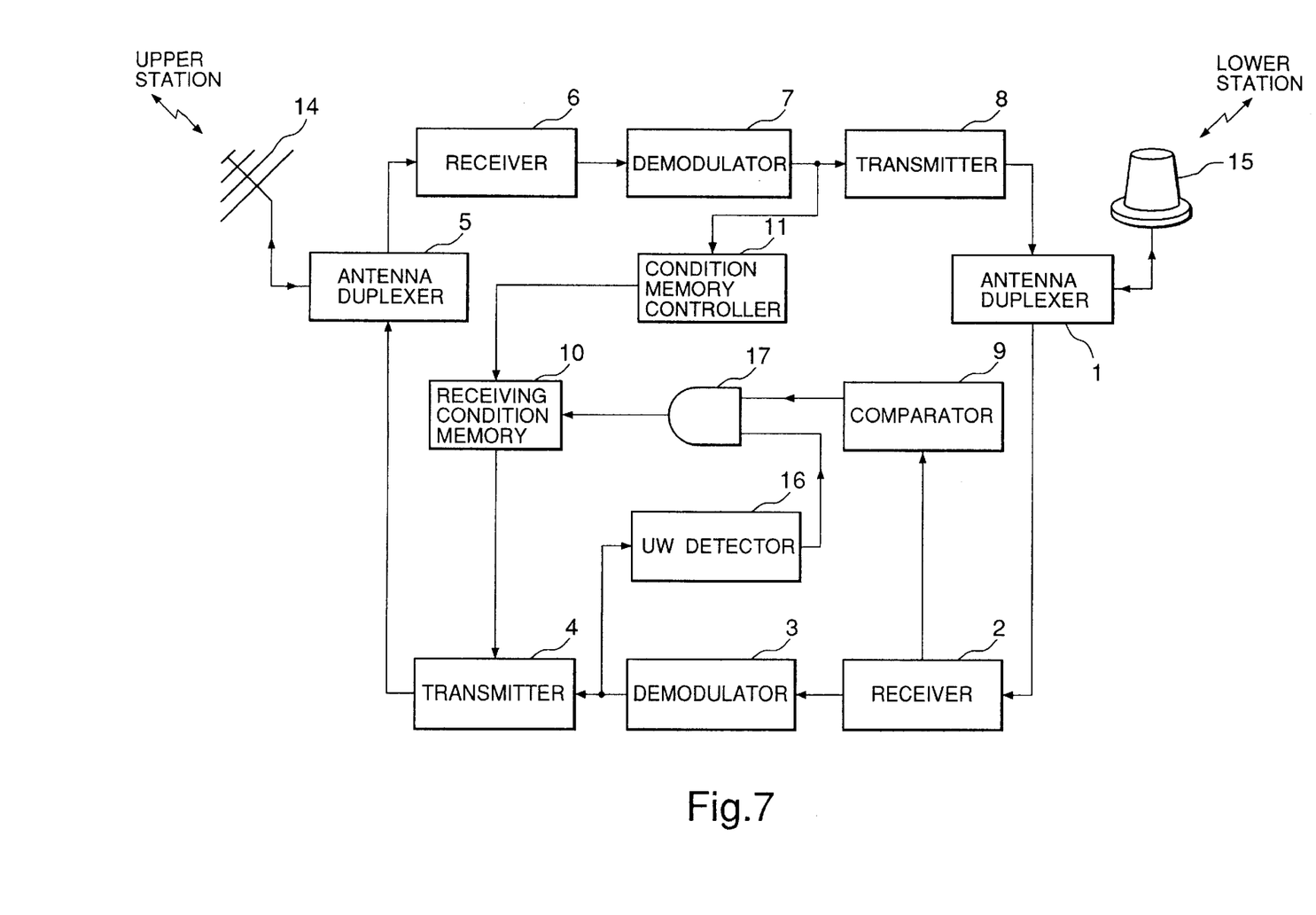
FIG. 7 is a block diagram showing the constitution of the repeater station according to a second embodiment of the present invention.

FIG. 7 is a block diagram of the repeater station according to a second embodiment of the present invention.

In FIG. 7, the left and right sides correspond to the upper station and the lower station, respectively. In FIG. 7, the signal repeating from the lower station to the upper station is carried out in the following way.

The signal which is transmitted from the lower station and which is received by the nondirectional antenna 15 is separated in the antenna duplexer 1. The separated received signal is amplified in the receiver 2, it is outputted to the demodulator 3, and the received signal level information is extracted in accordance with the level of the received signal, so that it is outputted to the comparator 9. The demodulator 3 demodulates the amplified signal from the receiver 2 and it returns the demodulated signal to the digital signal sequence, so that the digital signal sequence is outputted to the transmitter 4 and an unique word (UW) detector 16. The UW detector 16 extracts a UW signal (see FIG. 3(c)) at the top of the burst signal included in the digital signal sequence from the demodulator 3, and it outputs a UW existing signal. When the UW signal exists, the UW existing signal is at the "detected" level, for example, logic "1". When the UW signal does not exist, the UW existing signal is at the "not detected" level, for example, logic "0". The comparator 9 compares the level of the received signal level information from the receiver 2 and the reference level held inside the comparator 9. The burst existing signal is outputted at the "detected" level during the period when the received signal level information exceeds the reference level, that is, during the period wherein it is judged that the burst signal exists in the received signals. An AND circuit 17 executes the logical product of the UW existing signal and the burst existing signal outputted from the comparator 9, so that a second burst existing signal is outputted to the receiving condition memory 10.

Since the signal from the lower station to the upper station is the TDMA signal, respective signal levels of the UW existing signal outputted from the UW detector 16 and the burst existing signal outputted from the comparator 9 are changed in accordance with whether or not the burst signal exists in each time slot of the TDMA signal. Accordingly, the second burst existing signal transmitted from the AND circuit 17 to the receiving condition memory 10 is also changed in accordance with each time slot of the TDMA signal.

As clearly shown in FIG. 7, the logical AND of the UW existing signal outputted from the UW detector 16 and the burst existing signal outputted from the comparator 9 is executed, so that the second burst existing signal is obtained, whereby the error repeater transmission can be further more surely restrained.

The operation of the receiving condition memory 10 and the following operation are the same as the description with reference to FIG. 2.

Figure 8:
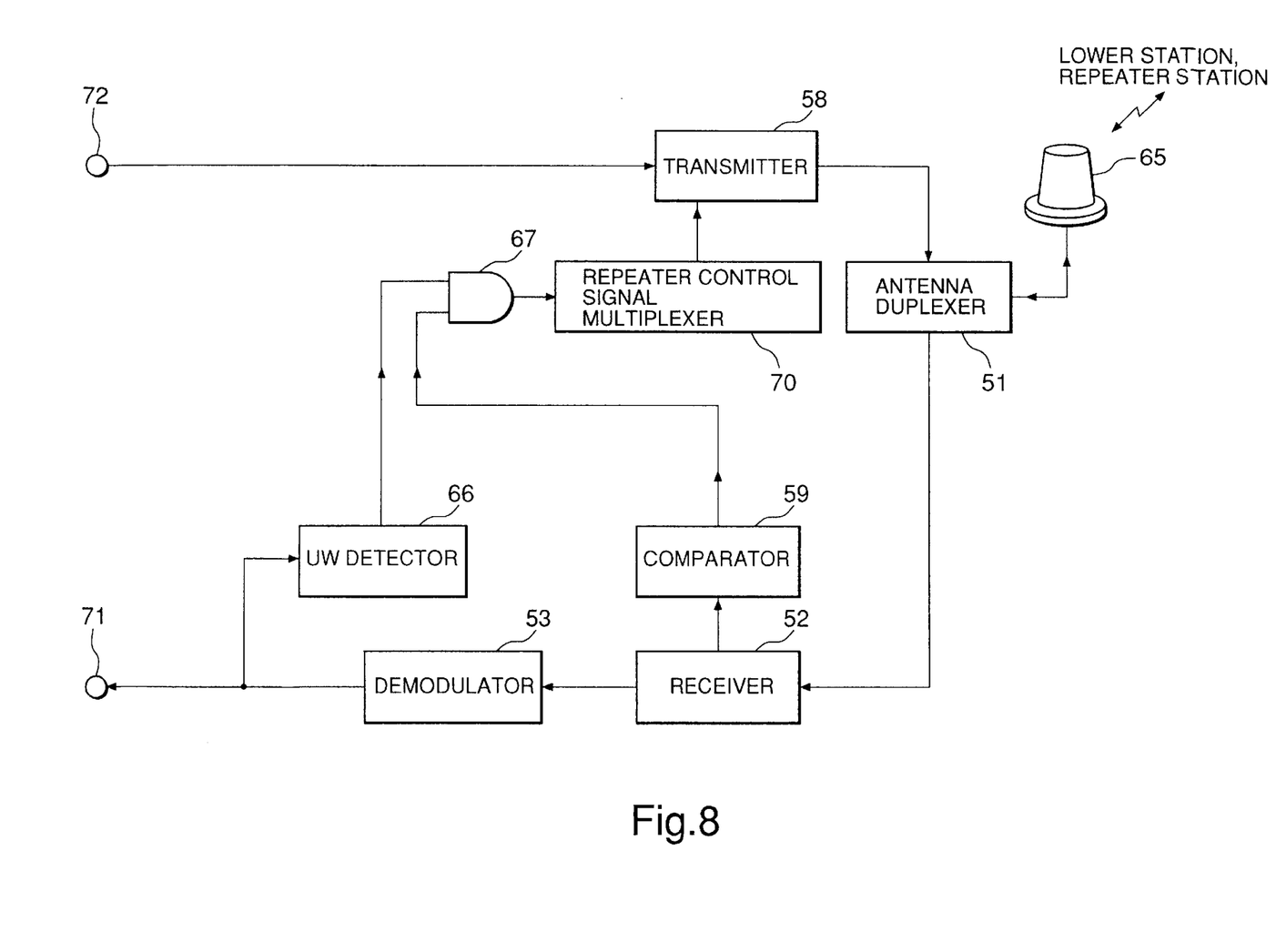
FIG. 8 is a block diagram showing an embodiment of an uppermost station.

FIG. 8 is a block diagram showing an example of the uppermost station. FIG. 8 shows an example as to how to use the extracted repeater control information which is used by the condition memory controller 11 shown in FIGS. 2, 4, and 7, that is, the usage state of each time slot of the TDMA signal from the uppermost station to each repeater station.

As shown in FIG. 8, in the uppermost station, the signal which is transmitted from the lower station is received by a nondirectional antenna 65 and separated in an antenna duplexer 51. The separated received signal is amplified in a receiver 52, outputted to a demodulator 53, and the received signal level information is extracted in accordance with the level of the received signal, so that it is outputted to a comparator 59.

A demodulator 53 demodulates the amplified signal from the receiver 52 to the digital signal sequence, so that the digital signal sequence is outputted to a UW detector 66 and an output terminal 71. The UW detector 66 extracts the UW signal' (see FIG. 3(c)) at the beginning of the burst signal included in the digital signal sequence from the demodulator 53, and it outputs the UW existing signal. A comparator 59 compares the level of the received signal level information from the receiver 52 and the reference level held inside the comparator 59. The burst existing signal is outputted at the "detected" level during the period when the "received" signal level information exceeds the reference level, that is, during the period wherein it is judged that the burst signal exists in the received signal. An AND circuit 67 executes and outputs the logical AND of the UW existing signal outputted from the UW detector 66 and the burst existing signal outputted from the comparator 59.

Since the signal from the lower station is the TDMA signal, respective signal levels of the UW existing signal outputted from the UW detector 66 and the burst existing signal outputted from the comparator 59 are changed in accordance with whether or not the burst signal exists in each time slot of the TDMA signal.

Accordingly, the output from the AND circuit 67 is also changed in accordance with each time slot of the TDMA signal.

A repeater control signal multiplexer 70 multiplexes the output signal from the AND circuit 67 to a burst used state signal in each time slot of the TDMA signal, and the multiplexed signal is outputted to a transmitter 58 as the repeater control information. The transmitter 58 carries out time division multiplexing on the digital signal sequence from an input terminal 72 and the repeater control information from the repeater control information multiplexer 70 so as to obtain the TDM signal. The TDM signal is transmitted from the nondirectional antenna 65 to the lower station via the antenna duplexer 51.

In the uppermost station shown in FIG. 8, although the usage state of the burst signal in each time slot is determined by extracting the received signal level information and the UW signal, the uppermost station may also be protected forward and backward so as to improve a reliability of the judgment of the usage state.

Figure 9:
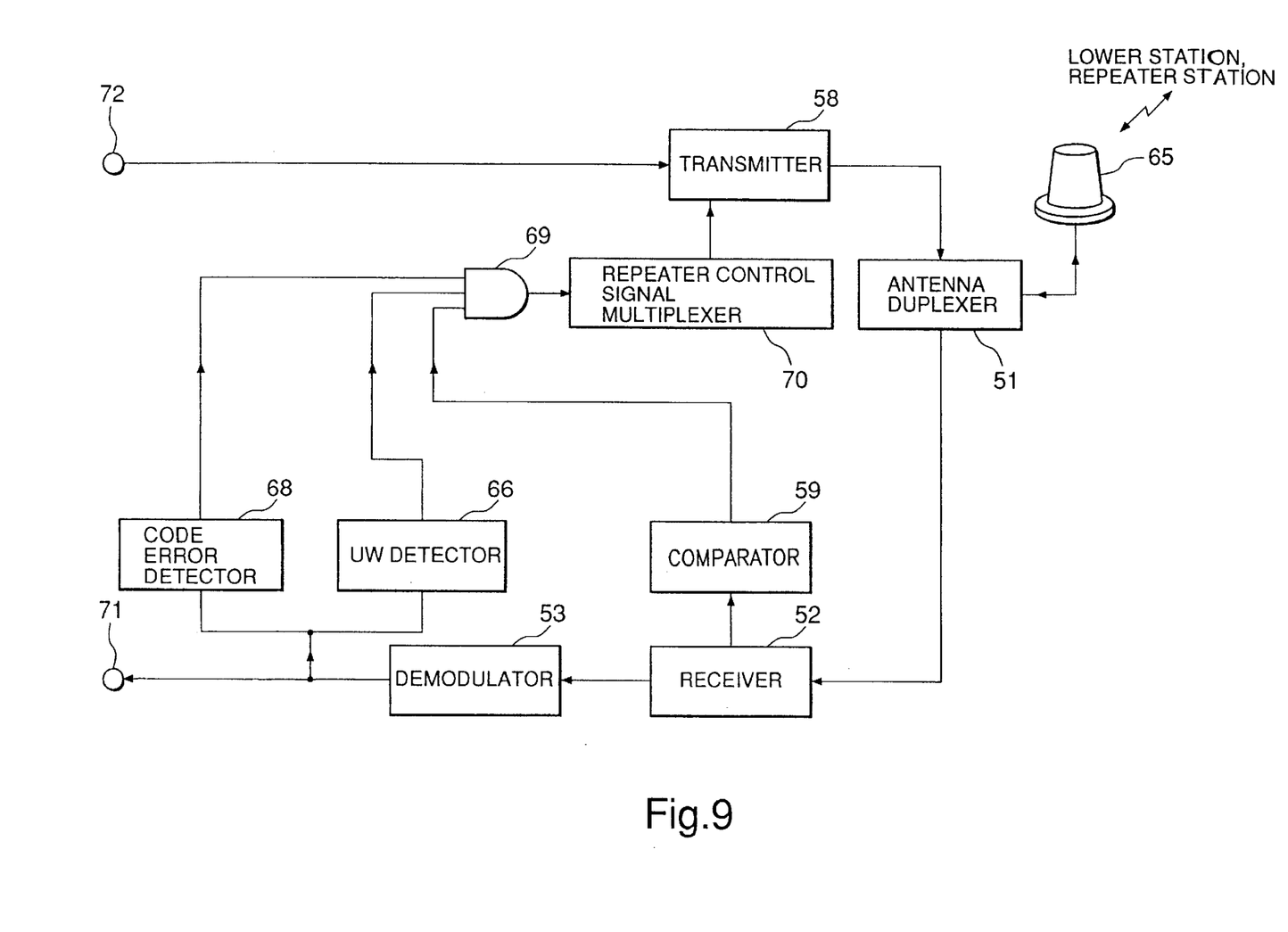
FIG. 9 is a block diagram showing the second embodiment of the uppermost station.

FIG. 9 is a block diagram showing a second example of the uppermost station.

The UW detector 66 extracts the UW signal at the beginning of the burst signal included in the digital signal sequence provided by the demodulator 53, and it outputs the UW existing signal at the corresponding level to the AND circuit 69. The comparator 59 compares the level of the received signal level information from the receiver 52 and the reference level held inside the comparator 59, and it outputs the burst existing signal at the corresponding signal level to the AND circuit 69. Furthermore, a code error detector 68 detects the error code of the burst signal in the digital signal sequence from the demodulator 53, and it outputs a normal received signal indicative of the normality of the received signal in each time slot of the TDMA signal. A known CRC system, BCH system or the like may be used as an error code detecting system by means of the error code error detector 68.

An AND circuit 69 executes and outputs the logical product of the UW existing signal outputted from the UW detector 66, the burst existing signal outputted from the comparator 59 and the normal received signal outputted from the code error detector 68. The repeater control signal multiplexer 70 multiplexes the output signal from the AND circuit 69 to the burst used state signal in each time slot of the TDMA signal, and the multiplexed signal is outputted to the transmitter 58 as the repeater control information.

In the uppermost station shown in FIG. 9, the usage state of the burst signal in each time slot is judged in accordance with the extracted received signal level information and UW signal and the normal received signal indicative of the normality of the received signal, whereby the reliability in determining the usage state of the time slot is improved. Furthermore, the uppermost station may be also protected forward and backward so as to obtain higher reliability.

Thus, according to the present invention, the following repeater transmission can be carried out.

That is to say, a received state of the burst signal is monitored in each time slot of the TDMA signal at the uppermost station. If the received state of the burst signal is judged to be used, this information, that is, the repeater control information, is multiplexed with the TDM signal, and the multiplexed information is transmitted to each repeater station. In each repeater station, the condition memory control signal (e) indicative of the received state in the corresponding time slot is "maintained". In each repeater station, when the condition memory control signal (e) is "maintained", the signal level of the burst existing signal having the received signal level of the received signal from the lower station is not stored in the receiving condition memory 10. The receiving condition memory 10 holds the signal level of the burst existing signal (f) in the time slot just before the condition memory control signal (e) is changed from the "renewed" state to the "maintained" state, and it outputs the signal level. Furthermore, when the condition memory control signal (e) is "not upgraded", the logical product of the output from the receiving condition memory 10 and the burst control signal (f) is executed, the repeater transmission to the corresponding time slot is controlled in accordance with the result. Therefore, when the uppermost station once determines that the time slot is being used, the repeater transmission of any other repeater stations, except for the repeater station carrying out the normal repeater transmission, is restrained relative to the corresponding time slot.

As clearly indicated by the above description according to the present invention, under such circumstances that an atmospheric interference having a strong receiving signal level, an interference signal, an jamming signal or the like exists, without increasing a transmission output from a radio equipment at each station, the influence due to the interference can be eliminated, and the repeater transmission can be continuously carried out without any trouble.

What is claimed is:

1. A radio communication repeater control method in which a plurality of repeater stations are intervened between an upper station and a lower station, each repeater station transmits a TDMA signal whose receiving signal level exceeds a reference value transmitted from the lower station to the upper station wherein said upper station generates a usage state information of respective time slots of said received TDMA signal and transmits the usage state information to each repeater station, each repeater station judges whether or not the corresponding time slot of the TDMA signal to be repeated is used in accordance with said usage state information received from said upper station, a repeater transmission to the time slot is allowed if the time slot is unused, the repeater transmission to the time slot is restrained if the time slot is used due to other repeater station, wherein each repeater station i) generates a first binary signal of the corresponding logical value to whether or not a received burst signal to the time slot exists when the time slot of the TDMA signal is unused;

ii) generates a second binary signal of the corresponding logical value to whether or not the received burst signal just before the change exists when the change of the time slot from an unused state to a used state is detected; and iii) generates a third binary signal of the corresponding logical value to the unused state and the used state of the time slot, whereby the repeater transmission to the time slot is allowed or restrained in accordance with a combination of the logical values of the first to third binary signals.

2. The repeater station according to claim 1 further searches an inherent information provided for the received burst signal and generates a fourth binary signal at the corresponding level to whether or not the inherent information exists, whereby a logical operation result of the fourth binary signal and the first binary signal is used as the corresponding logical value to whether or not said received burst signal exists.

3. A radio communication repeater control system comprising a plurality of repeater stations intervened between an upper station and a lower station, each repeater station being provided with a judging means for comparing the receiving signal level of each time slot of the TDMA signal transmitted from the lower station to the reference value and for judging whether or not the received burst signal exists;

a transmitting means for transmitting the received burst signal to the upper station when the received burst signal exists, wherein said upper station comprises a means for generating the usage state information of each time slot of the received burst signal and for transmitting the usage state information to each repeater station, each repeater station comprising a means for extracting the usage state information of said each time slot transmitted from the upper station, and a repeater control means for controlling a transmission operation of said transmitting means in accordance with said extracted usage state information and the judging result information from said judging means, said repeater control means comprising a means for generating a binary signal of the corresponding logical value to the usage state information of respective time slots in accordance with said extracted usage state information; and a state judging means for generating a first binary signal of the corresponding logical value to whether or not the received burst signal to the time slot exists when the time slot is unused, for generating a second binary signal of the corresponding logical value to whether or not the received burst signal exists just before the change when the unused time slot is changed to the used state, for judging a first logical condition of the first and second binary signals and the binary signal of the corresponding logical value to the current usage state of the time slot, and for judging a second logical condition of the judge result of the first logical condition and the first binary signal, the transmission operation being controlled in accordance with the judging result by said state judging means.

4. The repeater control means according to claim 3 further comprising inherent information detecting means for searching an inherent information provided for each received burst signal and for generating a fourth binary signal of the corresponding logical value to whether or not the inherent information exists, the judge result of the logical condition of the fourth binary signal outputted from the inherent information detecting means and said first binary signal is the logical value indicative of whether or not said received burst signal exists.

5. The radio communication repeater control system according to claim 3, wherein the upper station further comprises a monitor means for monitoring a normality of the signal in each time slot of the received TDMA signal, wherein the usage state information of a TDMA time slot is transmitted to each repeater station only when the received signal is normal.

6. A radio communication system repeater control method wherein the communication system comprises an upper station, a lower station, and a plurality of repeater stations located between the upper station and the lower station, wherein the communication system uses TDM so that TDMA signals having time slots are received by each of the plurality of repeater stations from the lower station and retransmitted to the upper station, the method comprising the steps of:

generating time slot usage data for a TDMA signal received in the upper station;

transmitting the time slot usage data to each of the plurality of repeater stations;

comparing, within each of the plurality of repeater stations, whether a received TDMA signal strength is greater than a pre-determined reference signal strength;

determining, within each of the plurality of repeater stations, whether a time slot to be repeated is used or unused in accordance with the time slot usage data received from the upper station;

allowing, within each of the plurality of repeater stations, a repeater signal transmission of the received TDMA signal if the time slot to be repeated is unused and the received TDMA signal strength is greater than the pre-determined reference signal strength; and restraining, within each of the plurality of repeater stations, an erroneous repeater signal transmission if the time slot to be repeated is used due to an interference signal input to another of the plurality of repeater stations.

7. A radio communication repeater control system using TDMA signaling, the system comprising:

an upper station having a means for generating usage state data for each time slot of the TDMA signal and transmitting the usage state data to each of a plurality of repeater stations;

a lower station;

said plurality of repeater stations being located between said upper station and said lower station to receive the TDMA signal from said lower station and to retransmit the TDMA signal to said upper station, said plurality of repeater stations comprising a comparing means for comparing the received signal level of each time slot of the TDMA signal to a reference value, and for determining the existence of a received TDMA burst signal, and a transmitting means for transmitting the received TDMA burst signal to said upper station when the received burst signal exists, a means for extracting the usage state data for each time slot of the TDMA signal transmitted from said upper station, and a repeater control means for allowing a repeater transmission in a time slot if the time slot is unused, and for restraining an erroneous repeater transmission in the time slot if the time slot is used due to an interfering signal input to another one of said plurality of repeater stations.

* * * * *